United States Patent
Chiu

(10) Patent No.: US 6,402,173 B1
(45) Date of Patent: Jun. 11, 2002

(54) GRAVITY TRICYCLE

(76) Inventor: Hsien-Chang Chiu, No. 12, Chuang Wei, Alley. 31, Kuang Hsing Sub-Ward, Pa Te City, Tao-Yuan Hsien (TW)

( * ) Notice: Subject to any disclaimer, the term of this patent is extended or adjusted under 35 U.S.C. 154(b) by 0 days.

(21) Appl. No.: 09/765,572

(22) Filed: Jan. 22, 2001

(51) Int. Cl.$^7$ ................................................. B62M 1/04
(52) U.S. Cl. ........................ 280/252; 280/253; 280/255
(58) Field of Search ................................. 280/251, 252, 280/258, 255, 221, 253, 282

(56) References Cited

U.S. PATENT DOCUMENTS

| | | | | | |
|---|---|---|---|---|---|
| 4,828,284 | A | * | 5/1989 | Sandgren | 280/255 |
| 5,368,321 | A | * | 11/1994 | Berman et al. | 280/221 |
| 5,451,070 | A | * | 9/1995 | Lindsay et al. | 280/252 |
| 6,173,981 | B1 | * | 1/2001 | Coleman | 280/253 |

FOREIGN PATENT DOCUMENTS

| | | | | |
|---|---|---|---|---|
| JP | 6135366 | * | 5/1994 | 280/252 |

* cited by examiner

Primary Examiner—Daniel G. DePumpo
(74) Attorney, Agent, or Firm—Rosenberg, Klein & Lee

(57) ABSTRACT

A gravity tricycle is driven by a power-saving drive device. The drive device includes first and second pedals, which have drive rods respectively connected to bottom edges thereof, front ends of the drive rods being pivotally disposed on a pivot shaft at the bottom edge of the front end of the rear frame such that the two pedals may move upward and downward with the pivot shaft as a fulcrum; a transmission shaft on the rear frame and having an intermediate section provided with two unidirectional flywheels corresponding to the first and second pedals such that the two flywheels drive the transmission shaft counterclockwise only, the transmission shaft being provided with a toothed disk on one side of one of the flywheels to drive the transmission chain; and first and second reciprocating chains having front ends connected to the drive rods of the first and second pedals and being wound past upper ends of the flywheels to extend rearwardly such that rear portions thereof are coupled with a connecting element that is wound around a rotary wheel to thereby establish a linking-up relationship.

3 Claims, 6 Drawing Sheets

GRAVITY TRICYCLE

BACKGROUND OF THE INVENTION (a) Field of the Invention

The invention relates to a gravity tricycle, more particularly to a tricycle that can be adapted as a means of transportation, and for exercising and recreation.

(b) Description of the Prior Art

Tricycles are supported on three wheels and are hence more stable compared to two-wheeled bicycles. For those who do not know how to ride a bicycle, riding tricycle is another option. The drive structure for a tricycle is substantially the same as that for a bicycle, and includes a front pedal that rotates to drive a front toothed disk, which drives a rear wheel via a chain. A tricycle with such a drive structure relies on the force exerted on the pedals to drive the tricycle along, which requires a large amount of force, particularly on slopes. For very steep slopes, it is more difficult for the tricycle to climb, and the rider may have to get down and push the tricycle up the slope.

SUMMARY OF THE INVENTION

The primary object of the present invention is to provide a gravity tricycle that utilizes gravitational pull on the rider as a source of power for driving the tricycle in a power-saving manner.

Another object of the present invention is to provide a gravity tricycle that can be adapted for recreational and exercising purposes.

A further object of the present invention is to provide a gravity tricycle has a speed change function and a good slope climbing capability.

In order to achieve the above objects, the power-saving drive device according to the present invention includes first and second pedals, which have drive rods respectively connected to bottom edges thereof, front ends of the drive rods being pivotally disposed on a pivot shaft at the bottom edge of the front end of the rear frame such that the two pedals may move upward and downward with the pivot shaft as a fulcrum; a transmission shaft on the rear frame and having an intermediate section provided with two unidirectional flywheels corresponding to the first and second pedals such that the two flywheels drive the transmission shaft counterclockwise only, the transmission shaft being provided with a toothed disk on one side of one of the flywheels to drive the transmission chain; and first and second reciprocating chains having front ends connected to the drive rods of the first and second pedals and being wound past upper ends of the flywheels to extend rearwardly such that rear portions thereof are coupled with a connecting element that is wound around a rotary wheel to thereby establish a linking-up relationship.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
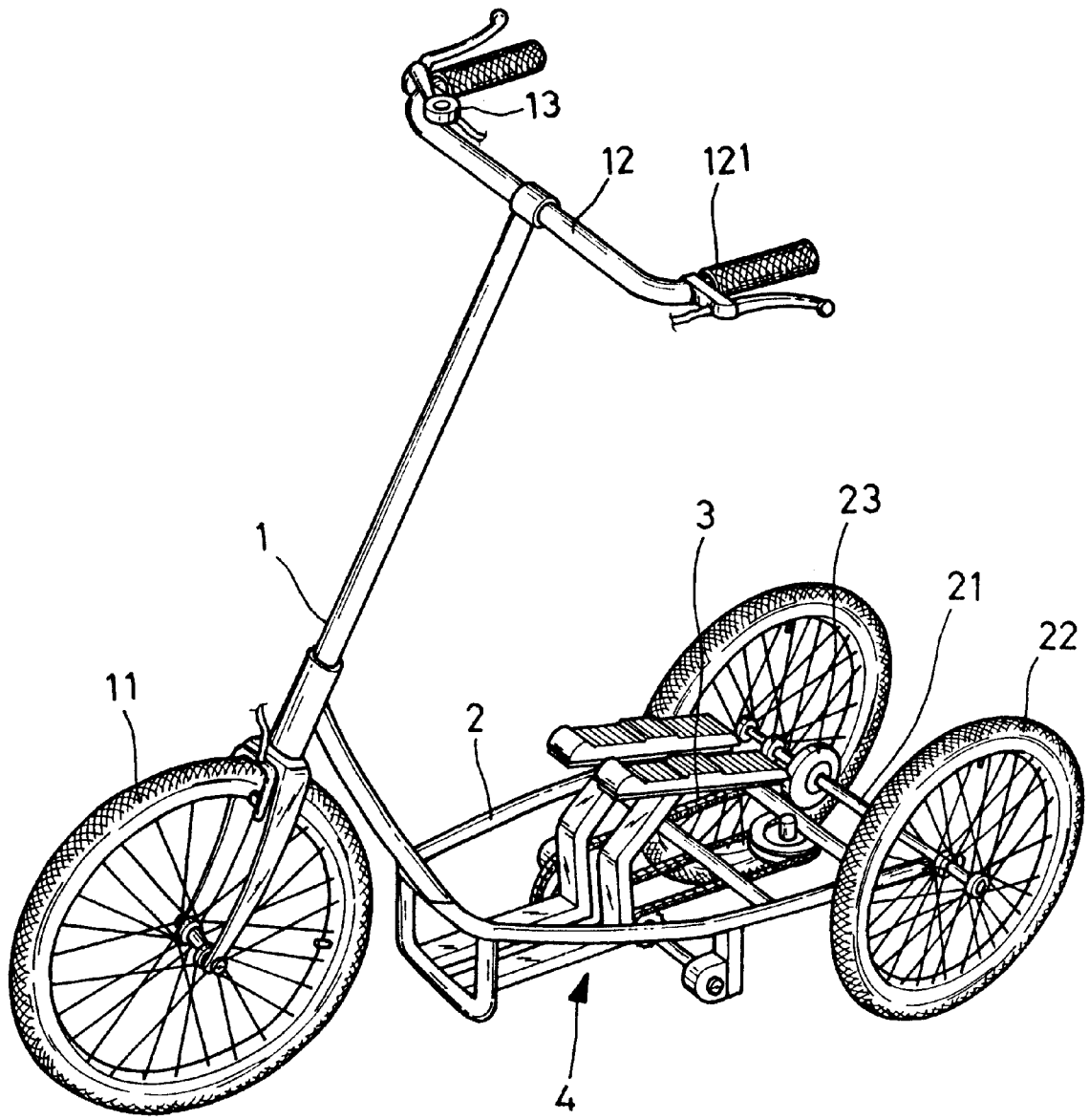
FIG. 1 is a perspective view of the present invention.

With reference to the drawings, a gravity tricycle according to the present invention is shown to comprise a front frame 1 including a front wheel 11, a handle 12, a brake 121 and a speed change controller 13; a rear frame 2 connected to a rear end of the front frame 1 and including a rotary shaft 21, two rear wheels 22 disposed at two ends of the rotary shaft 21 and a speed change toothed disk 23, the shifting of which is controlled by the speed change controller 13 .of the front frame 1; and a transmission chain 3 driven by a power-saving drive device 4 which is wound around the speed change toothed disk to drive the rotary shaft 21 to rotate the two rear wheels 22 for advancement.

The invention is characterized in that the drive device 4 further includes first and second pedals 41a, 41b, which have drive rods 411 respectively connected to bottom edges thereof. Each drive rod 411 includes a first member 412, a front end thereof being pivotally coupled to a pivot shaft 42 at the bottom edge of the front end of the rear frame 2 and extending longitudinally therefrom. Each drive rod 411 further includes a second member 413 having a first end coupled to a rear end of the first member 412 and extending transversely therefrom. The opposing second end of the second member 413 is coupled to a respective pedal 41, such that the two pedals 41 may move upward and downward with the pivot shaft 42 as a fulcrum. A transmission shaft 43 is disposed on the rear frame 2 and has an intermediate section provided with two unidirectional flywheels 44 corresponding to the first and second pedals 41a, 41b, such that the two flywheels 44 drive the transmission shaft 43 counterclockwise only. The transmission shaft 43 is provided with a toothed disk 45 on one side of one of the flywheels 44 to drive the transmission chain 3. The drive device 4 also includes first and second reciprocating chains 46a, 46b having front ends respectively connected to the rear ends of the first members 412 and are wound past upper ends of the flywheels 44 to extend rearwardly such that rear portions thereof are coupled with a connecting element 48 that is wound around a rotary wheel 47 to thereby establish a linked-up relationship.

Furthermore, the connecting element 48 may be a steel cable, a belt or any other equivalent element.

Figure 2:
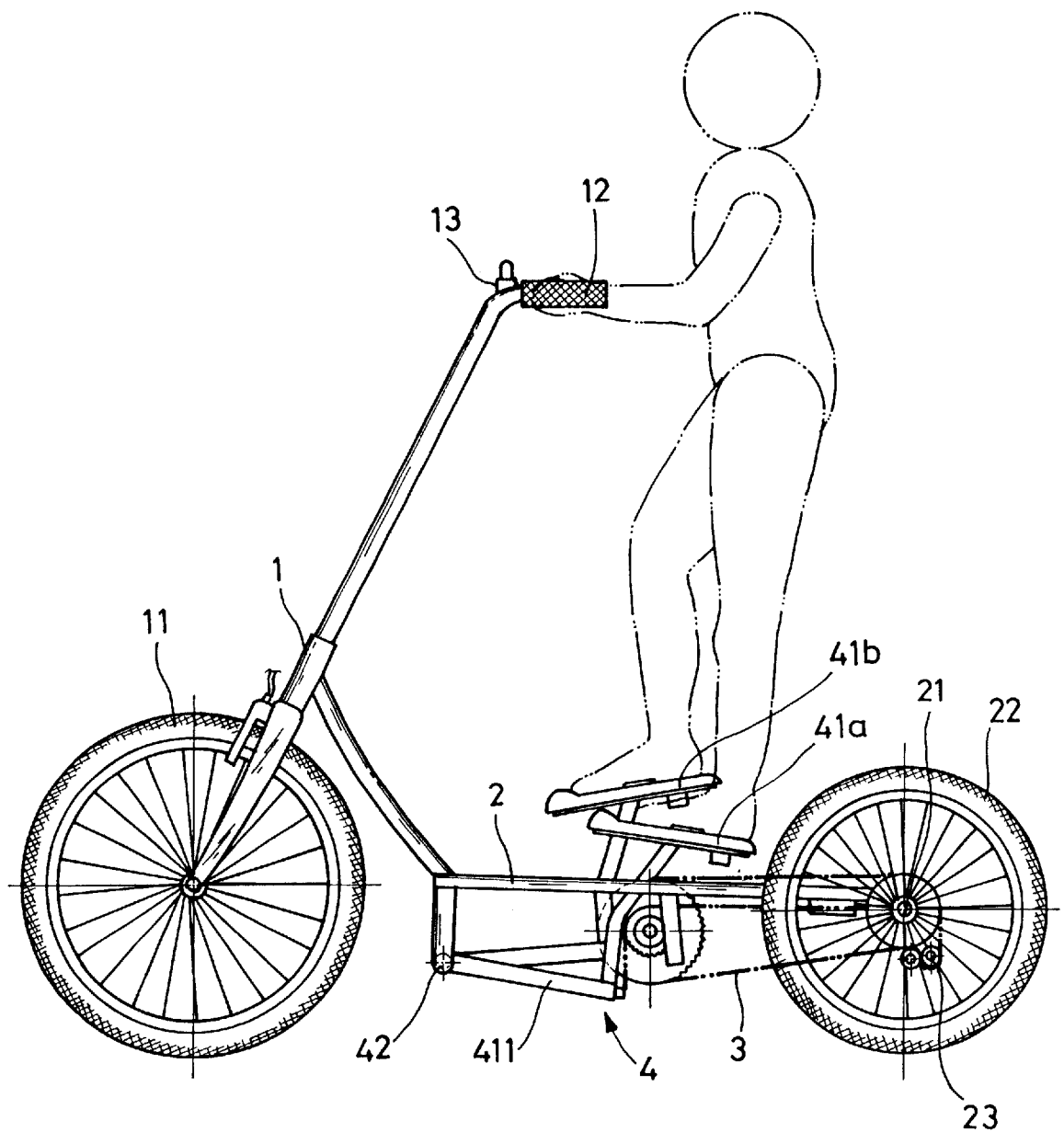
FIG. 2 is a schematic view of the present invention in use.
Figure 3:
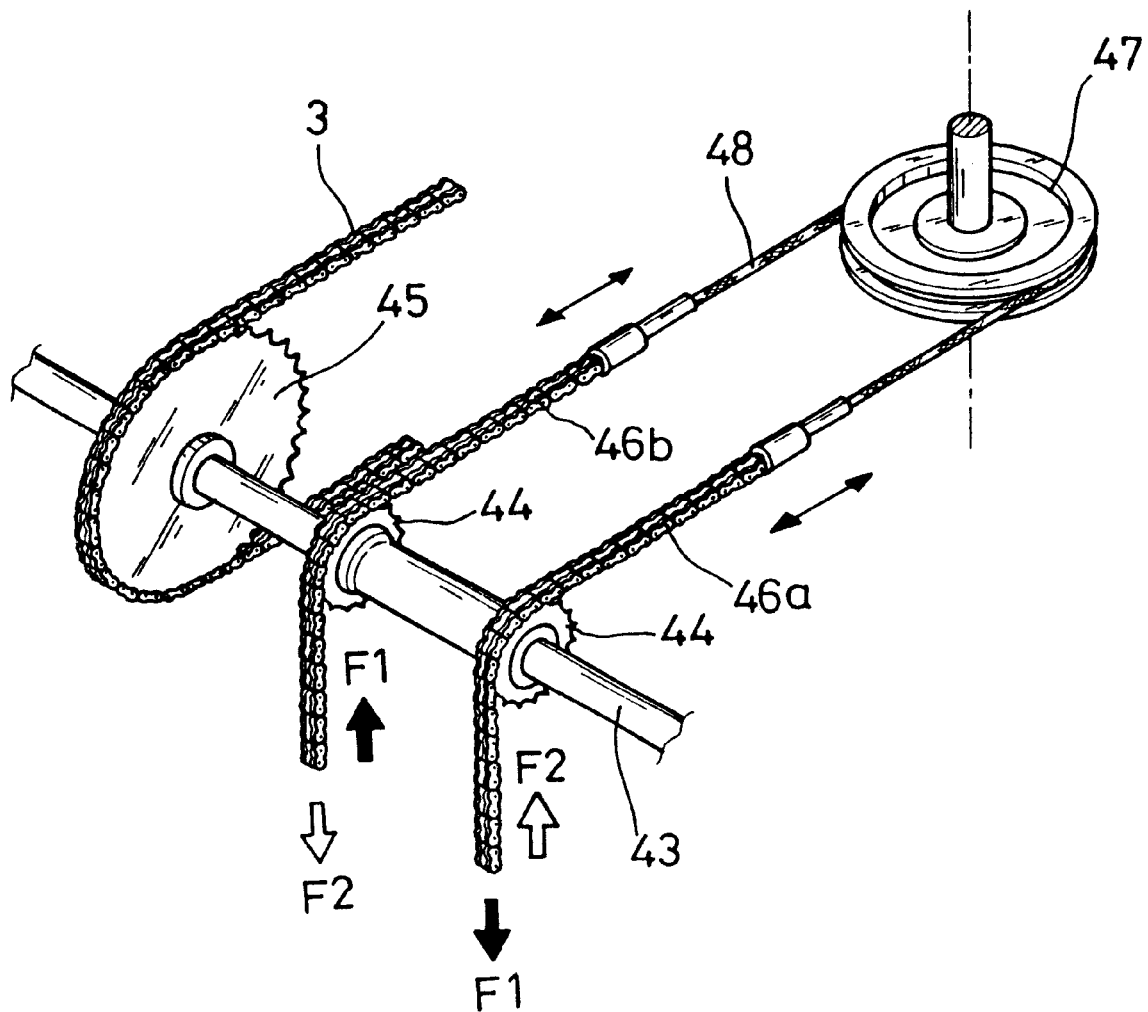
FIG. 3 is a schematic view of a transmission system according to the present invention.
Figure 4:
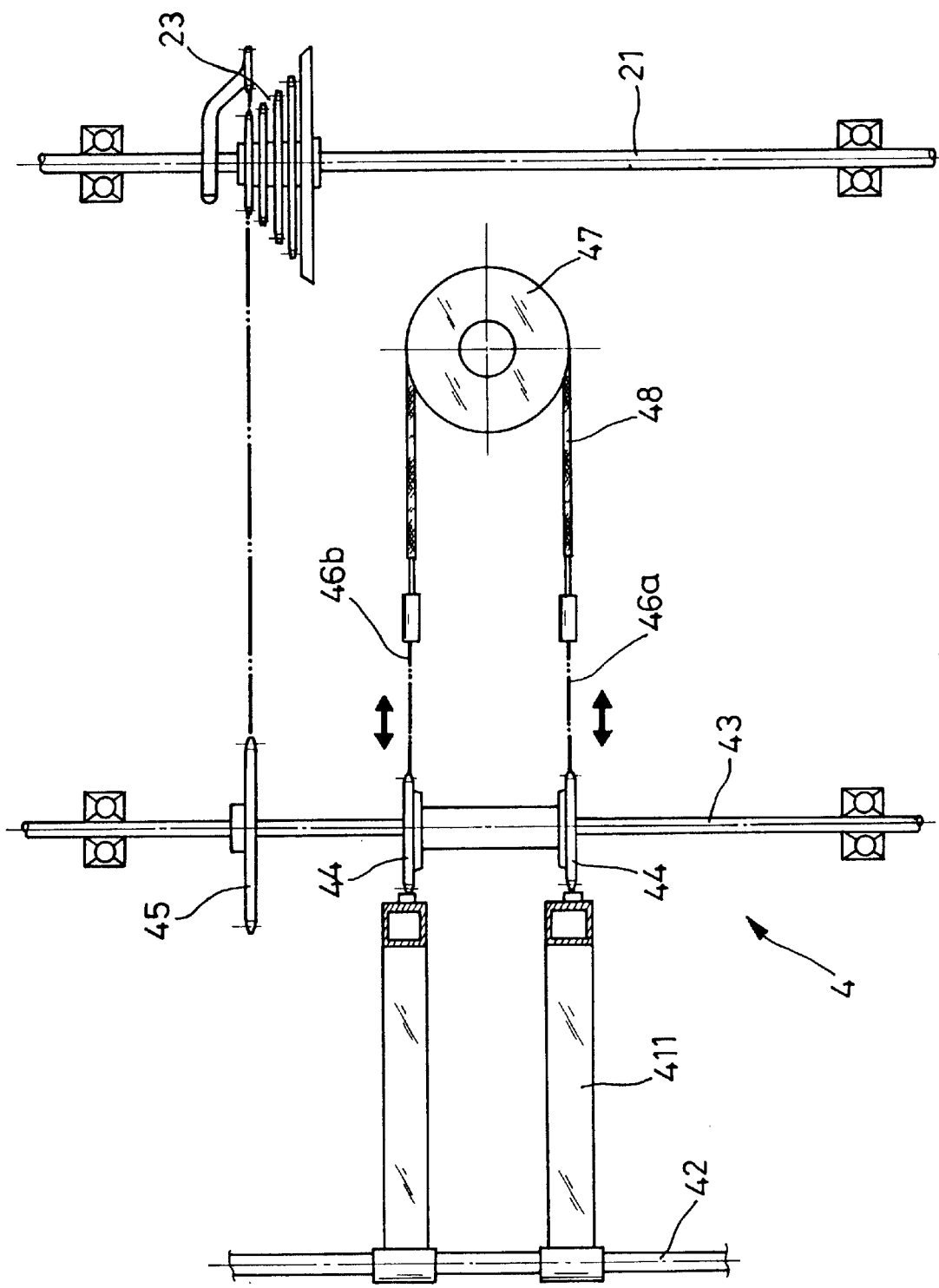
FIG. 4 is a top view of the transmission system according to the present invention.
Figure 5A:
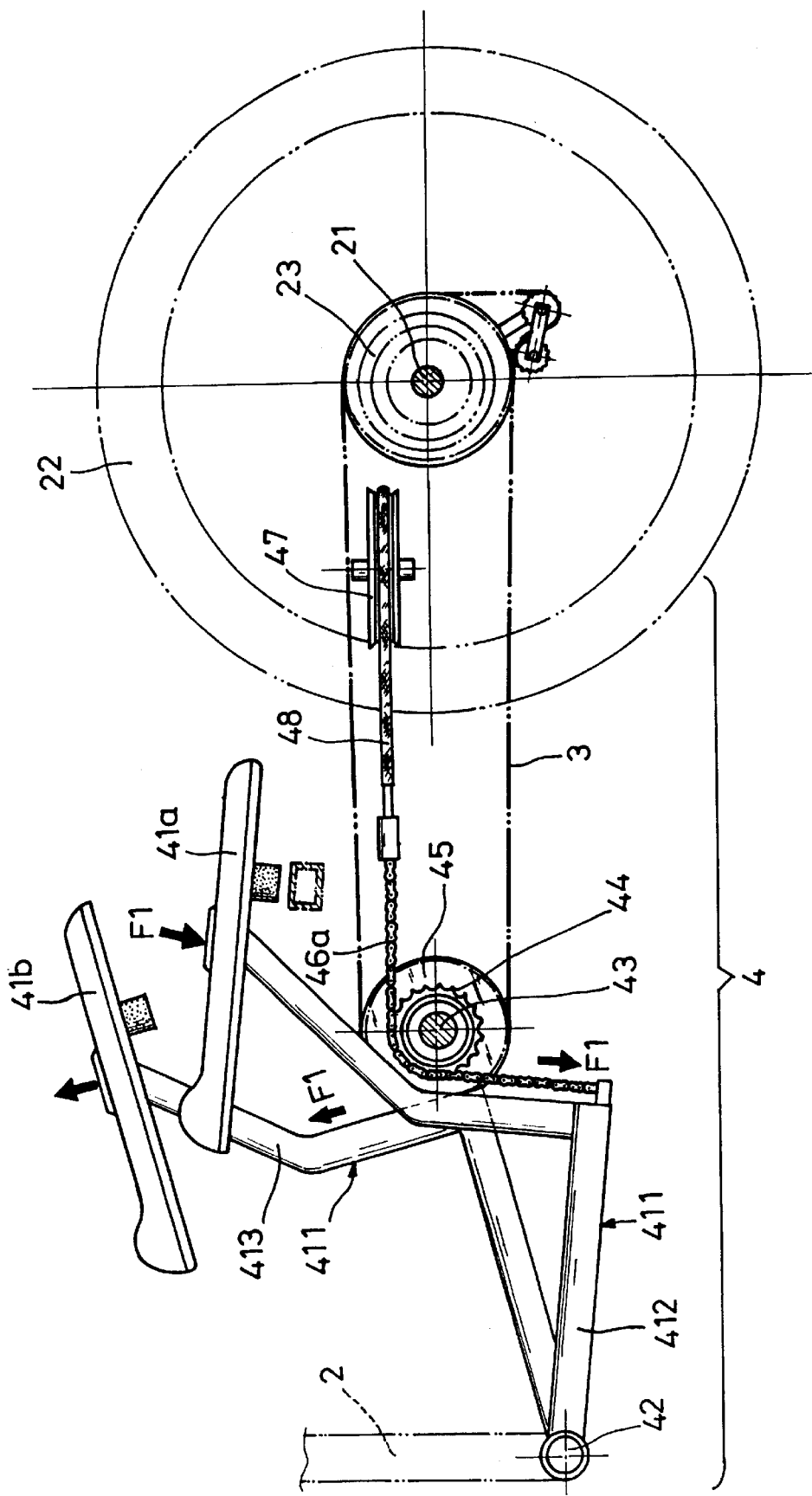
FIGS. 5A and 5B are top views of the transmission system according to the present invention.
Figure 5B:
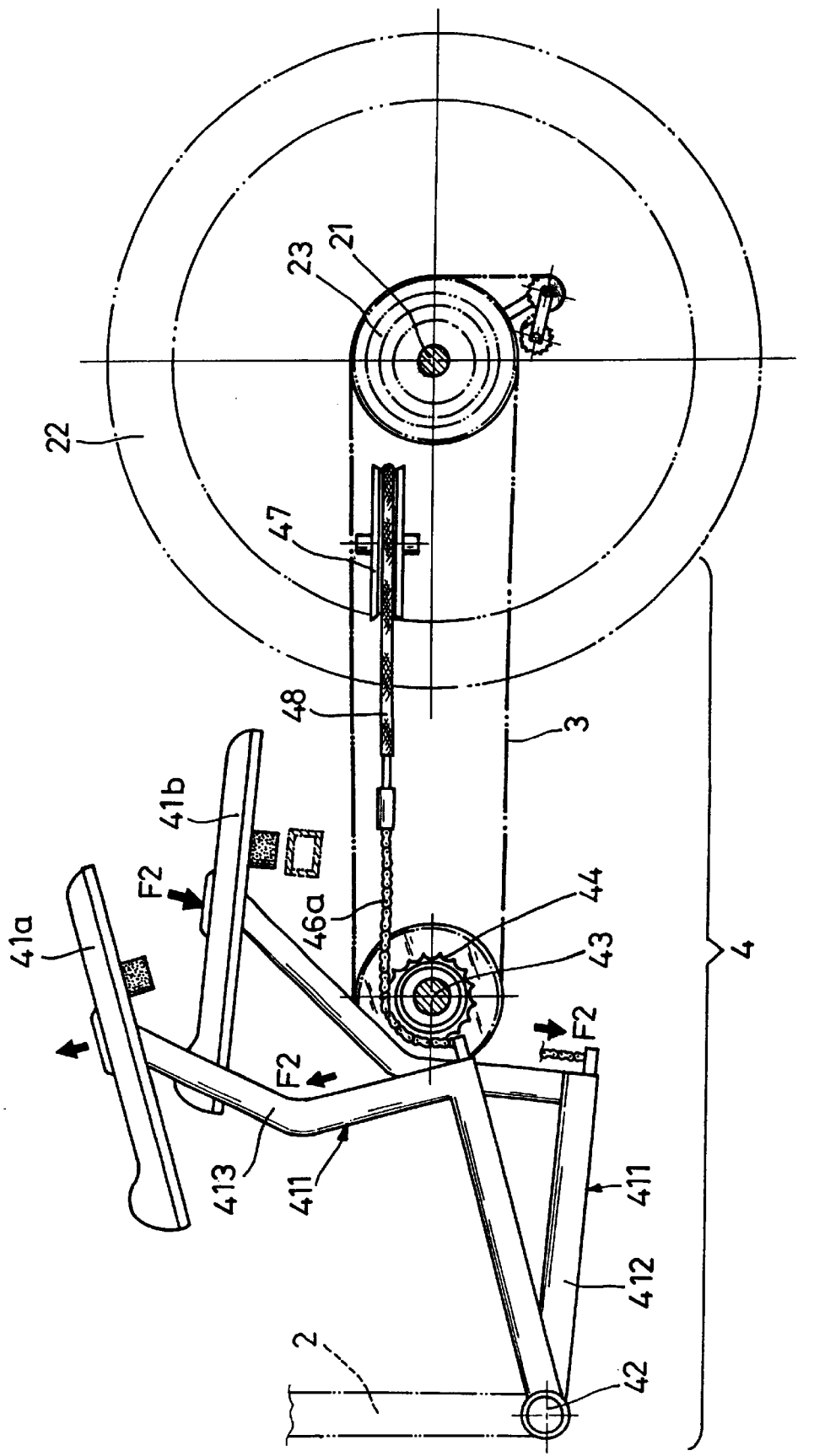

Based on the aforesaid characterizing features, in use, referring to FIG. 2, the rider steps on the first and second pedals and presses the first pedal 41a downward by virtue of his/her own weight. The firstly pressed first pedal 41a pulls, by virtue of gravity (F1), the first reciprocating chain 46a that is connected thereto and forces the flywheel 44 that is wound thereby to rotate counterclockwise to thereby drive the transmission shaft 43 to rotate, which brings the toothed disk 45 to drive, via the transmission shaft 3, the rotary shaft 21 of the rear wheel to result in advancement of the tricycle.

Furthermore, when the first pedal 41a reaches a lower starting point, the second pedal 41a is at the upper starting point. At this time, gravity (F2) acts upon the second pedal 41b and pulls the second reciprocating chain 46b that is connected thereto so that the flywheel 44 that is wound thereby rotates counterclockwise to continue rotating the rotary shaft 43 following the action of the first reciprocating chain 46a upon the other flywheel 44. At this point, the first reciprocating chain 46a pulls back so that the flywheel 44 brought to move thereby is in an idle state with respect to the transmission shaft 43.

Therefore, when the rider steps on the first and second pedals 41a, 41b lightly, due to the linking up relationship between the two pedals 41a, 41b, which move up and down alternately, the tricycle can be advanced without requiring much force.

Furthermore, when the tricycle is to climb a slope, the speed change controller 13 can be used to switch the speed change toothed disk 23 to a low speed shift to thereby increase torque. In combination with the ingenious configuration of the power-saving drive device 4, the tricycle can climb a slope smoothly.

In this invention, unlike the prior art which uses pedaling to drive a tricycle, the invention utilizes the weight of the rider to drive the tricycle. According to the principle of mechanics, the weight of the rider can be transferred into dynamic force to drive the tricycle while allowing the rider to exercise his/her body. Thus, the tricycle according to this invention has the triple functions of providing a means of transportation and serving as means for recreation and exercising.

Although the present invention has been illustrated and described with reference to the preferred embodiment thereof, it should be understood that it is in no way limited to the details of such embodiment but is capable of numerous modifications within the scope of the appended claims.

What is claimed is:

1. A gravity tricycle, comprising:

a front frame including a front wheel, a handle, a brake and a speed change controller, a rear frame connected to a rear end of said front frame and including a rotary shaft, two rear wheels disposed at two ends of said rotary shaft and a speed change toothed disk, shifting of which is controlled by said speed change controller of said front frame; and a transmission chain driven by a power-saving drive device which is wound around said speed change toothed disk to drive said rotary shaft to rotate said two rear wheels for advancement;

wherein said drive device includes first and second pedals, which have drive rods respectively connected to bottom edges thereof, each of said drive rods including a longitudinally extended first member having a front end thereof pivotally disposed on a pivot shaft at a bottom edge of a front end of said rear frame, each said drive rod including a second member having a first end coupled to a rear end of said first member and extending upwardly therefrom, said second member having a second end coupled to a respective one of said two pedals such that said two pedals move upward and downward with said pivot shaft as a fulcrum;

a transmission shaft on said rear frame and having an intermediate section provided with two unidirectional flywheels corresponding to said first and second pedals such that said two flywheels rotatably drive said transmission shaft in only one direction, said transmission shaft being provided with a toothed disk on one side of one of said flywheels to drive said transmission chain;

and first and second reciprocating chains having front ends respectively connected to said rear end of said first members of said drive rods and being wound past upper ends of said flywheels to extend rearwardly, said first and second reciprocating chains having respective rear portions coupled together with a connecting element that is wound around a rotary wheel to thereby establish a linked-up relationship between said pedals.

2. The gravity tricycle according to claim 1, wherein said connecting element is formed by a steel cable.

3. The gravity tricycle according to claim 1, wherein said connecting element is formed by a belt.

* * * * *